June 20, 1939. W. M. DUNCAN, JR 2,163,488
SEAL
Filed March 28, 1938

INVENTOR.
WILLIAM M. DUNCAN JR.
BY Kwis Hudson & Kent
ATTORNEYS

Patented June 20, 1939

2,163,488

UNITED STATES PATENT OFFICE 2,163,488

SEAL

William M. Duncan, Jr., Shaker Heights, Ohio

Application March 28, 1938, Serial No. 198,360

2 Claims. (Cl. 292—317)

This invention relates to seals such as are used for railway cars, packing cases, valves, indicator posts, and the like, and has for its principal object to provide a seal which can be produced inexpensively and therefore sold at low cost and which is extremely effective or efficient as a sealing or locking instrumentality.

The seal is of the strap type having a locking end and a free end which is adapted to be slipped into a shell or equivalent part surrounding the locking end, the two ends being so formed that when thereafter a force is applied in a direction to separate the ends they will be automatically locked together by the features constituting the present invention in a manner such that the seal will effectively resist anything but the most unusual force to separate the ends.

The invention may be briefly summarized as consisting in certain novel details of construction and combinations and arrangements of parts which will be described in the specification and set forth in the appended claims.

In the accompanying sheet of drawings, wherein I have illustrated the preferred embodiment of the invention, Fig. 1 is a plan view of the seal with the strap extended or in its normal position;

Figure 7:
Figure 9:
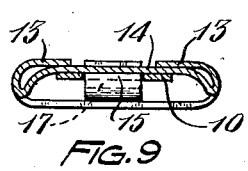
Figure 8:
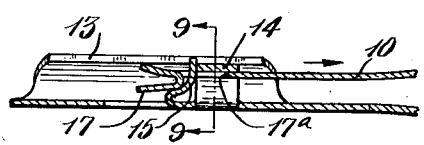

Figs. 5, 6, 7, and 8 are enlarged detail sectional views showing the locking end and the opposite end in various relative positions; and Fig. 9 is a sectional view substantially along the line 9—9 of Fig. 8.

The seal comprises a flat strap 10 formed from flexible sheet steel or other suitable metal the ends of which may for convenience be referred to respectively as the locking end and the free end, and the seal also comprises a metal shell 11 of well-known construction which shell is formed in two substantially hemispherical sections which are crimped together at their meeting edges and the shell is thus fastened around the locking end and securely held in place thereon.

The locking end of the strap, when first blanked out, is somewhat wider than the remainder of the strap and has two side portions 12 which are flanged upwardly and inwardly, as shown at 13. The locking end of the strap also has a bridge 14 struck upwardly therefrom which bridge spans the space between the lower fold lines of the flanges 13. Additionally, the locking end has just at the rear of the bridge 14 a struck-up tongue 15 which is inclined upwardly and rearwardly with its upper rear edge at a height which is about the same or slightly less than the bridge 14.

The shell 11, when applied to the formed locking end shown in Fig. 9 and fastened in place by crimping together the adjacent edges of the complementary halves thereof, is securely held against movement in either direction by the flanged side portions 13. The rear part of this shell has a slot just deep enough to take the rear part of the locking end of the strap and the front part has a slot somewhat wider so that the free end of the strap may be inserted therein.

Figure 1:
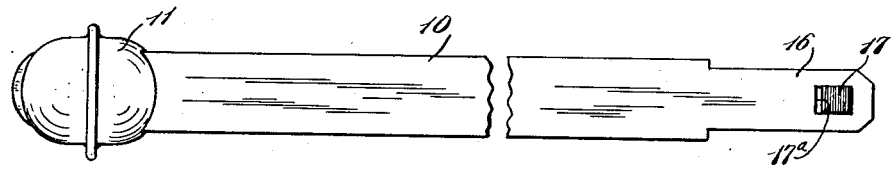
Figure 2:
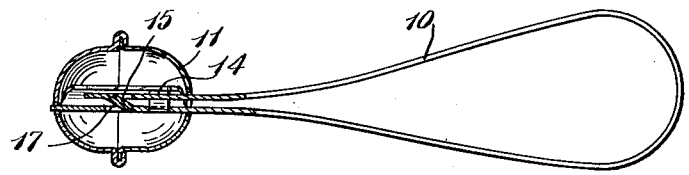
Fig. 2 is a side view with parts in section showing the ends of the seal in locked position.
Figure 3:
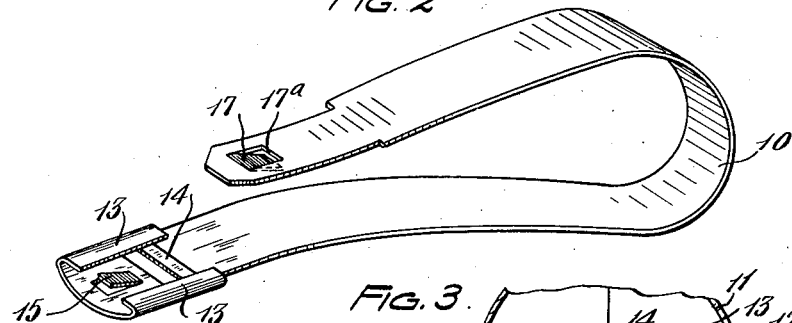
Fig. 3 is a perspective view omitting the shell at the locking end and showing the two ends just before the free end is placed in locking position with respect to the locking end.
Figure 4:
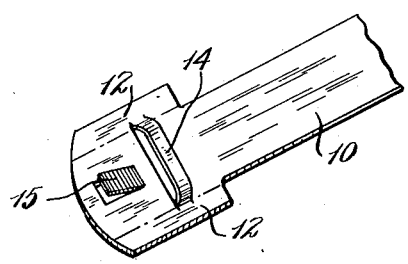
Fig. 4 is a fragmentary perspective view on a slightly enlarged scale showing the locking end when it is first blanked out and before certain side portions are flanged or bent upwardly and inwardly.
Figure 5:
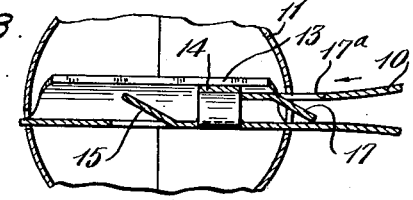
Figure 6:
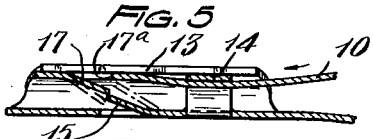

The free end of the strap is somewhat reduced in width, as shown at 16, and it is provided near the end thereof with a spring tongue 17 which when the strap is doubled upon itself as shown in Fig. 3 extends downwardly and forwardly as compared with the upward and rearward relation of the spring tongue 15. The ends of the seal are placed in locking engagement by bending the strap upon itself so as to bring the free end up to the slot in the forward side of the shell 11, and it is then inserted in the shell in the manner indicated in Figs. 5 and 6 beneath the bridge 14. As it is moved inwardly or rearwardly, the downwardly and forwardly projecting spring tongue 17 rides over the upwardly and rearwardly extending tongue 15 of the locking end, and in so doing the tongue 17 is sprung upwardly and the tongue 15 is sprung downwardly with both tongues thus placed under tension. As the free end of tongue 17 clears the free end of tongue 15, the former springs downwardly and the latter springs upwardly to the position shown by dotted lines in Fig. 6.

The seal is now in locked position, and if a pull is exerted on the strap so as to tend to disengage the ends, the free end will move forwardly slightly with the tongue 17 sliding underneath the tongue 15, as illustrated in Fig. 7, and if greater separating force is exerted on the strap, the tongues will be bent into the relative positions indicated in Fig. 8 which shows the tongue 15 bent upwardly into the opening 17a formed when the tongue 17 was punched and is brought up against the edge of the bridge 14. At the same time the tongue 17 on the free end is doubled back upon itself, as shown in Fig. 8, and by reason of the action of these tongues and the positions which they assume under the pulling stress, the separation or opening of the seal is to all intents and purposes prevented except under extraordinary or destructive force. After the parts have been bent to the position shown in Fig. 8, the seal cannot be opened by slipping the free end back and forth for by no such movement can the interlocking parts be disengaged.

The straps of the seals formed in accordance with my invention can be produced rapidly by simple stamping operations, and as the shell is formed in like manner and can be applied and the two halves locked by the stroke of a seaming press, the entire seal can be very inexpensively produced in quantities and therefore sold at low cost. This fact, together with the effectiveness of the seal, renders the same a desirable manufacturing product.

While I have shown the preferred construction, I do not desire to be confined to the precise details shown but aim in my claims to cover all modifications and adaptations which do not constitute a departure from the spirit and scope of the invention.

Having thus described my invention, I claim:

1. A seal of the character described comprising a strap having a locking end and a normally free end, the locking end having a bridge and a tongue projecting upwardly therefrom in the same direction from the plane of the strap with the tongue at the rear of the bridge and its free end extending rearwardly, the normally free end of the strap having an integral tongue projecting therefrom with its free extremity extending forwardly and toward the plane of the locking end, means forming an enclosure for the locking end and having an opening for the insertion of the normally free end, whereby when the normally free end is inserted into said enclosure it passes beneath the bridge, and when the normally free end passes the tongue on the locking end said tongues snap into such relative positions that when separating movement is applied the tongues interlock, and on the application of further separating force the tongue on the locking end will be bent up against the bridge by the tongue on the normally free end.

2. A seal of the character described comprising a strap having a locking end and a normally free end, the locking end having a bridge and a tongue projecting upwardly therefrom with the tongue at the rear of the bridge and extending from the strap upwardly and away from the bridge, the normally free end likewise having a tongue projecting therefrom with its free extremity extending forwardly and downwardly, the side portions of the strap at the sealing end being bent inwardly toward each other so as to overlap the bridge and reinforce the ends thereof, whereby when the normally free end is inserted into the locking end beneath the bridge, and the tongue on the normally free end passes rearwardly beyond the tongue on the locking end, the two tongues snap into locking engagement and when separating movement is applied to the strap the tongue on the normally free end bends the tongue on the locking end up against said bridge, and a shell enclosing the locking end and held against movement by its engagement with said reenforcing flanges.

WILLIAM M. DUNCAN, Jr.